US007867094B1

(12) United States Patent
Wisdom et al.

(10) Patent No.: US 7,867,094 B1
(45) Date of Patent: Jan. 11, 2011

(54) METHODS FOR PROMOTING THE DEVELOPMENT AND SHARING OF CONTENT AND A DYNAMICALLY MODIFIED COMPUTER GAME

(75) Inventors: Matthew Morgan Wisdom, New Orleans, LA (US); Timothy Lowell Soslow, New Orleans, LA (US); James Harrington Reily, Metairie, LA (US); Christopher Patrick Phillips, New Orleans, LA (US); Michael S. Lee, Kissimmee, FL (US); Andrew Bell Wisdom, New Orleans, LA (US); Brian John Gaffney, Thousand Oaks, CA (US); Matthew Wayne Hales, Tracy, CA (US); Daniel Joseph Salas, Orlando, FL (US); Nathan Solomon, Philadelphia, PA (US)

(73) Assignee: Turbo Squid, Inc., New Orleans, LA (US)

( * ) Notice: Subject to any disclaimer, the term of this patent is extended or adjusted under 35 U.S.C. 154(b) by 1062 days.

(21) Appl. No.: 11/637,901

(22) Filed: Dec. 13, 2006
(Under 37 CFR 1.47)

Related U.S. Application Data

(63) Continuation-in-part of application No. 11/281,508, filed on Nov. 18, 2005, now abandoned.

(60) Provisional application No. 60/629,226, filed on Nov. 18, 2004.

(51) Int. Cl.
*G06F 17/00* (2006.01)

(52) U.S. Cl. .......................................................... 463/43
(58) Field of Classification Search .................. 463/42, 463/43; 705/40
See application file for complete search history.

(56) References Cited

U.S. PATENT DOCUMENTS

| 6,217,024 | B1 | 4/2001 | Lofink et al. ................. 273/292 |
| 7,249,060 | B2 * | 7/2007 | Ling ........................... 705/26 |
| 2002/0010026 | A1 | 1/2002 | York ........................... 463/47 |
| 2002/0083179 | A1 | 6/2002 | Shaw et al. .................. 709/227 |
| 2002/0165026 | A1 | 11/2002 | Perkins et al. ................ 463/42 |
| 2003/0125112 | A1 | 7/2003 | Silvester ...................... 463/42 |
| 2005/0181878 | A1 | 8/2005 | Danieli et al. ................. 463/42 |
| 2006/0143690 | A1 * | 6/2006 | Lin et al. ........................ 726/2 |
| 2008/0163312 | A1 * | 7/2008 | Faust et al. ................... 725/93 |
| 2008/0208692 | A1 * | 8/2008 | Garaventi et al. ............. 705/14 |
| 2009/0034463 | A1 * | 2/2009 | Rao ........................... 370/329 |

OTHER PUBLICATIONS

Hyman, Paul, "In-Game Advertising—But First a Word From Our Sponsor," *Game Developer*, vol./Issue 11, 7 pp., Jun. 1, 2006.

(Continued)

*Primary Examiner*—Ronald Laneau
(74) *Attorney, Agent, or Firm*—King & Spalding LLP

(57) ABSTRACT

An application is described for facilitating the modification of an underlying computer game by players and developers; the development and testing of game modifications via a publishing infrastructure; the sharing and playing of game modifications and the marketing of available game modifications. Users subscribe to the application or are charged a fee to access individual content and partake in these game modification processes across a network infrastructure.

7 Claims, 9 Drawing Sheets

OTHER PUBLICATIONS

International Search Report and Written Opinion for Application No. PCT/US05/41965, dated Jan. 18, 2008 (mailing date).

StarCraft, "Frequently Asked Questions" [online], Copyright 2008 [retrieved on Jan. 14, 2008], 1 p., Retrieved from the Internet: http://web.archive.org/web/*/http://www.battle.net/scc/faq/multi.shtml.

* cited by examiner

METHODS FOR PROMOTING THE DEVELOPMENT AND SHARING OF CONTENT AND A DYNAMICALLY MODIFIED COMPUTER GAME

CROSS REFERENCE TO RELATED APPLICATIONS

The present application is a continuation-in-part of U.S. patent application Ser. No. 11/281,508 filed Nov. 18, 2005 now abandoned entitled METHOD OF DYNAMICALLY MODIFYING A COMPUTER GAME which claims the benefit of similarly titled U.S. provisional patent application No. 60/629,226 filed Nov. 18, 2004, which is incorporated herein by reference in its entirety.

BACKGROUND OF THE INVENTION

1. Field of the Invention

The invention is directed generally to computer game modifications. More particularly, the invention describes a system and method for allowing developers and/or retailers to develop and offer game modifications to consumers and for consumers to play, create and share game modifications through a network infrastructure.

2. Description of the Related Art

Referred to as game modification, computer and video games have historically been modified to allow for different play of the stock game. For example, a computer game originally coded for play with World War II weaponry, could be changed, i.e., files added, in order to allow the user to utilize modern weaponry, e.g., M16 machine gun, in the World War II setting and situations.

Creating a game modification requires technical knowledge of the inner workings of the game being modified, and this skill has typically been beyond the skill of the ordinary user, e.g., consumers, who play such games.

Accordingly, there is a need in the art for a method and system which allows the consumer, i.e., buyers and players of video games, to create (and thus become modifiers), use and share game modifications. Further, there is a need in the art for a game modification network, through which modifications may be developed, sold, and shared by modifiers, retailers, and users. Currently available multi-player on-line games, may be shared under a number of scenarios. The most common scenario is where each player purchases the game and the multiple users are able to play together on-line. There are many examples of such games including World of Warcraft played via the personal computer, Halo played via Microsoft's Xbox and Madden Football games played via Sony's PlayStation 2. In an alternative scenario, the game is initially offered for free to all users for a limited amount of time and then must be purchased by all players after expiration of the free trial period. Finally, there are games shared for free. The currently available business models for promoting and sharing multi-player games do not offer an effective solution for sharing additional content developed in accordance with embodiments of the invention described herein, while also generating revenue for the business that supports the underlying platform for dynamic content development.

In accordance with the embodiments described below, the nature of the content developed is extremely diverse. A developer or game player (hereafter "first user") may select from thousands and thousands of items to add to an underlying game. And each time the first user dynamically changes an underlying game by adding, removing, changing content, the first user may wish to share this game modification with other users in a multi-player environment. Since new and different game modifications are constantly being developed, the problem becomes, how does the first user easily share the successive game modifications with other users without requiring every additional user to purchase each item of the game modification. The ability to share game modifications must be user friendly, e.g., relatively hassle-free, while also generating some profitability to the business supporting the game modification platform. The prior art solutions are not workable with the novel dynamic game development embodiments described herein.

SUMMARY OF THE INVENTION

In a first exemplary embodiment of the present invention, a method for modifying the content of a game capable of being played on a processor is described. The method includes: providing access to a modification application to implement a modification to a game; providing the ability for a user to identify a game to modify to the modification application; providing access to content files for use in modifying the identified game; accepting user selection of at least one content file for use in modifying the content of the selected game; and creating at least one modification configuration file for implementing the data in the at least one content file during play of the selected game.

In a second exemplary embodiment of the invention, a method for sharing a modified version of an underlying game is described. The method includes: accepting at a host an invitation from a first player to play a modified version of the underlying game for forwarding to at least a second player; inviting a second player to play the modified version of the underlying game; receiving an acceptance from the second player to play the modified version of the underlying game; determining if the second player has access to a modification application for sharing the modified version; if the second player does have access to the modification application, prompting the second player to log-in to modification application; if the second player does not have access to the modification application, prompting the second player to request access to the modification application, granting access to the modification application if requirements for access are met and prompting the second player to log-in to the modification application; determining if the second player has the underlying version of the game installed on the second player's processor; if the second player does have the underlying game, installing the modified version of the underlying game on the second player's processor; if the second player does not have the underlying game, inviting the second player to obtain the underlying game, determining when the underlying game has been obtained and installing the modified version of the underlying game on the second player's processor.

In a third exemplary embodiment of the present invention, a method for facilitating the purchase of game modifications is described. The method includes: detecting when a user has accessed a modification application, the modification application containing at least one subapplication for each underlying game for modifying the underlying game; scanning the processor of the user to determine if each underlying game for which the modification application has at least one subapplication are located on the user's processor; if the user's processor contains all underlying games for which the modification application has at least one subapplication, determining if the user has current modifications to the underlying games included in the at least one subapplication for each underlying game; if the user's processor does not have current modifications for each of the underlying games, offering the user access to the at least one subapplication for each of the underlying games containing current modifications; and if the user's processor does not contain all underlying games for which the modification application has at least one subapplication, determining which underlying games the user is missing, offering the user access to the underlying games and subsequently offering the user access to the at least one subapplication containing current modifications for each of the underlying games.

In a fourth exemplary embodiment of the present invention, a method for facilitating the design and publication of modified game content is described. The method includes: providing at least one processor including at least one database for collecting and storing data related to the development of modified game content for a previously released underlying game; providing a search interface to the at least one processor including at least one database wherein a user can enter search terms to identify personnel and modification projects; storing files related to the development of a game content modification; publishing a developed game content modification; and providing a platform for facilitating at least one test of the developed game content modification.

In a further embodiment of the present invention, a method for sharing modified content of a game capable of being played on a processor is described. The method includes: providing access to a modification application including a list of pre-defined content embodied in content files to implement a modification to an underlying game; charging a first fee to access each pre-defined content file; accepting user selection of and payment of the first fee for at least one pre-defined content file for use in modifying the content of the underlying game; modifying the underlying game using the at least one pre-defined content file to create a modified game; and facilitating the invitation of at least one additional user to play the modified game.

In still a further embodiment of the present invention, a second method for sharing modified content of a game capable of being played on a processor is described. The method includes: providing access to a modification application including a list of pre-defined content embodied in content files to implement a modification to an underlying game; charging a first fee to access each pre-defined content file; accepting first user selection of and payment of the first fee for at least one pre-defined content file for use in modifying the content of the underlying game; modifying the underlying game using the at least one pre-defined content file to create a first modified game; charging a second fee to access and customize the at least one pre-defined content file; accepting second user selection of and payment of the second fee to access and customize the at least one pre-defined content file for use in modifying the content of the underlying game; and modifying the underlying game using the customized at least one pre-defined content file to create a second modified game; wherein the first user and the second user may play both the first modified game and the second modified game free of charge.

In yet a further embodiment of the present invention, a method for facilitating the development and sharing of new content for use with an underlying game played on a processor is described. The method includes: providing access to a modification application, including a game development engine; facilitating the development of new content via the game development engine; providing a first mechanism for offering access to the new content to users of the modification application free of charge; providing an alternative, second mechanism for offering access to the new content to users of the modification application for a fee; and providing the developer with compensation for development of the new content upon selection of the second mechanism, wherein the compensation is determined based on the fee.

BRIEF DESCRIPTION OF THE DRAWINGS

The present invention may be better understood, and its numerous features and advantages made apparent to those skilled in the art by referencing the accompanying drawings.

DETAILED DESCRIPTION OF THE INVENTION

As one skilled in the art will realize from a reading of the embodiments described herein, the methods described below, either in their entirety or individual steps and groupings of steps thereof, may be practiced on any number or various types of processors, processing systems, servers and/or networks, including open, closed, proprietary, public networks and the like. This includes stand-alone processors, i.e., not connected to the Internet or other open network, and networked processors connected to the Internet or other open network, through hard-wire or wireless capabilities. The processors may be any device capable of running a video game, including, but not limited to, a personal computer ("PC") having hard drive or other form of data storage such as flash RAM and/or ROM or game console, e.g., Microsoft's Xbox®, Nintendo GameCube®, Sony PlayStation®, etc.

Figure 1:
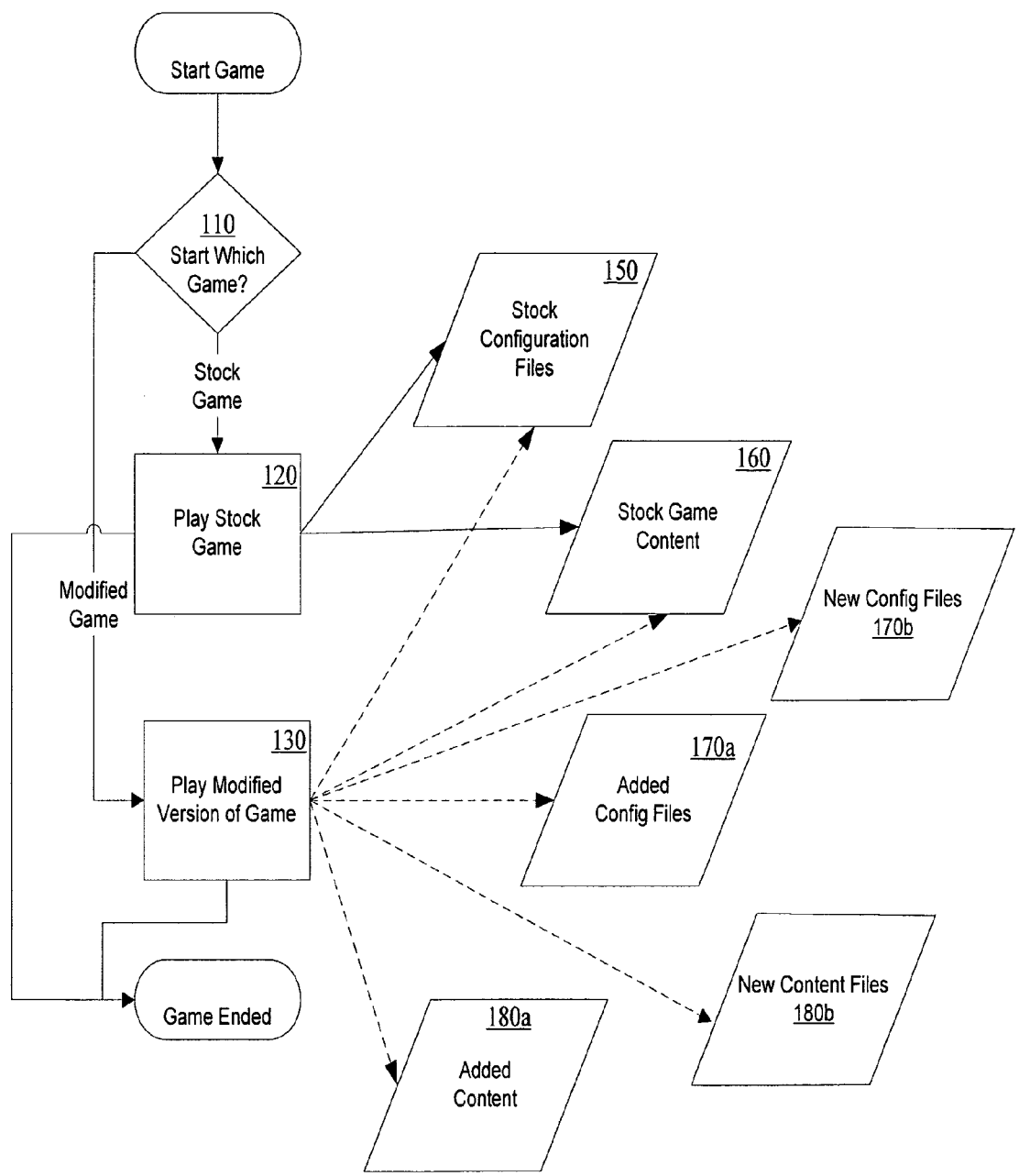
FIG. 1 is a flowchart of the basic process of modifying a computer game.

FIG. 1 is a flowchart that details the normal process of game playing versus the process of playing a modified game. When the user goes to start the game, the user must choose whether to play the stock game, or to play a modified version of the game. The user typically makes this choice 110 either prior to launching the game by adding special commands to the initial execution of the game, or after the game has started through a menu of recognized modifications offered by the game.

In the case where the user is playing the stock game 120, the game will load the stock content files 160 and the stock configuration files 150 to play the game as originally sold by the publisher. Examples of content files 160 and 180*a* and 180*b* are 3d models, textures, sounds, and image files. Examples of configuration files 150 and 170*a* and 170*b* are .ini and text files.

In the case where the user would like to play a modified version of the game, the game will typically load not only the stock content files 160 and the stock configuration files 150, but also any modified configuration and/or content files 170*a*, 170*b*, 180*a*, 180*b*. These modified files could be added content files 180*a* and added configuration files 170*a* which are in addition to the stock content and stock configuration files 150, 160. Alternatively, the stock content files 160 and the stock configuration files 150 may be superseded by new configuration files 170*b* and/or new content files 180*b*.

Figure 2:
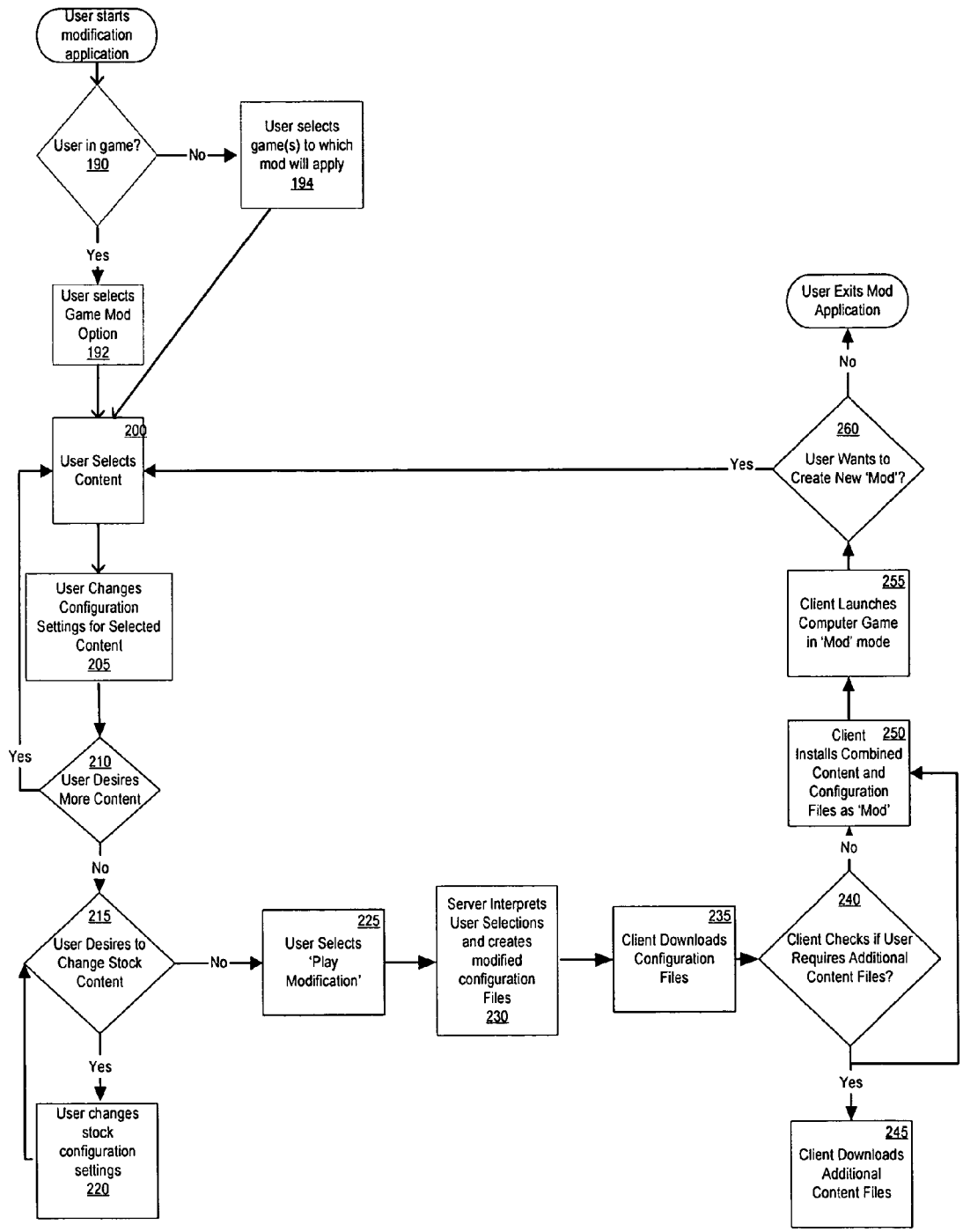
FIG. 2 is a flowchart of the process employed by the invention when used by a consumer.

FIG. 2 is a flowchart of the process employed by the invention when used by a consumer for creating a new modification. The modification application (hereafter "MA") may reside on the consumer's processor, e.g., PC, phone, PDA, or console, (hereafter "user processor") may reside partially on the consumer's processor and partially on at least one host server or, in a preferred embodiment, the MA resides on at least one host server. In order to access the MA on the host server, the consumer logs in through, for example, a Web interface accessible via the Internet or a proprietary interface accessible through a console connected through proprietary or public lines, e.g., phone lines. In a preferred embodiment, the consumer must be a subscriber in order to obtain a valid login identifier ("ID") and password. Alternatively, access may be free and no login ID and password required or free with login ID and password required. Further still, the consumer may access for free, but be required to provide payment information in order to access and use individual game content items and/or subapplications as described below.

The MA may be accessed independently of game-play 190 or during game-play. In the latter instance, the game may be paused and a menu provided, wherein one of the menu choices is "Create Modification?" 192 If the consumer accesses the MA outside of game play, the MA queries the consumer to identify for which game(s) the consumer wishes to create a modification 194. Once the user has launched the MA, the user is asked to select the content 200 to add to the game modification that he or she is creating. The MA maintains a library of content available for each game. Some examples of game content are a game map and level, game-play styles for a map or level, a tank, a race car, a spaceship, a speedboat, a fighter jet, a handgun, a laser rifle, swords, grenades, crossbows, fireballs, a humvee vehicle, an animal, human and non-human characters such as gangsters, aliens, cowboys, zombies, marines, dwarves, werewolves, business people, and an infantry soldier. The user is then asked to make any desired changes 205 to the various values and settings for this content. In the case of a tank, this could include the speed of movement of the tank in miles per hour, the cost to construct in dollars, and whether the tank uses an artillery canon or a flamethrower as its main weapon. One skilled in the art recognizes that the types and amount of content, values and settings is unlimited. The examples provided herein are not intended to be limiting. The user may make changes to multiple content items 210.

Once the user is satisfied with the content and the settings of that content that have been selected for the game modification, the user has the option of making changes 215 to the stock content files. Stock game content is content that came with the game at the time of purchase. For example, a game about World War II might come with a U-Boat as one of the submarines that a user might pilot. The user can change 220 the settings that govern the U-Boat within the game, for instance, to allow it to go into deeper water than the designers of the original game allowed for. In the example of the U-Boat as game content, the stock content files might include a 3d model of the U-Boat, a rusty texture file that is painted on the model, and the sound file of a propeller underwater. The present invention implements the content changes from steps 200-220 with, referring to FIG. 1, additional content files 180*a* which are in addition to the stock content files 160 or via new content files 180*b* which supersede the stock content files 160.

When the user no longer desires to change the configuration settings relating to the stock content 160, the user then may press the 'play modification' button 225 in the MA. This action triggers a series of processes. Firstly, the server will interpret 230 the user selections and create modified (mod) configuration files 170*a* or 170*b* that will cause the game to include the desired content changes of the user.

An alternate embodiment for creating the modified configuration files 170*a* and 170*b* is for the server to create a list of changes to the stock configuration files 150 that are stored within the game on the user's processor. The MA would then create the set of additional configuration files 170*a*, 170*b* by processing the change list on the stock configuration files 150 that were installed with the game.

The MA will download 235 the configuration files 150 and 170*a* or 170*b* from the server. Following this, the MA will check 240 with the server if any additional content files 180*a* are required in order for the game modification to function. In the case where additional content files 180*a* are required on the client processor, the MA will download 245 all such additional content files.

The preferred embodiment for the game modification is to use a system where all or as many as possible of the modified content files 180*a*, 180*b* are installed on the user processor at the same time as either the MA is installed and/or accessed and subsequently updated each time the user accesses the MA to modify and/or play the game. Installation could be accomplished on-line over the network connection between the user processor and the host server or via CD-ROM off-line at the user processor. This dramatically reduces the download time required to create each subsequent modification of the game by the user. Alternatively, the content files are installed on the user processor as selected by the user.

Once all of the appropriate content files 180*a* or 180*b* and configuration files 170*a* or 170*b* are on the user processor, the MA installs 250 those files into the appropriate user file folders in whatever format is required by the selected game. Alternatively, the install may be accomplished via a web browser plug-in. The MA then launches 255 the game in the appropriate way such that the user can play the modified version of the game that he or she created.

The user at any time will then make the decision 260 to either make a new modification to the game or to exit the MA, or to use some other functionality included in the MA.

An alternate embodiment of this invention is to remove the client/server aspect and to create the whole invention as a self-sustained application on the user's processor wherein no Internet or other networking connectivity is required. In this embodiment, the user would be limited in the types of modifications that may be created as the MA would be static.

Figure 3:
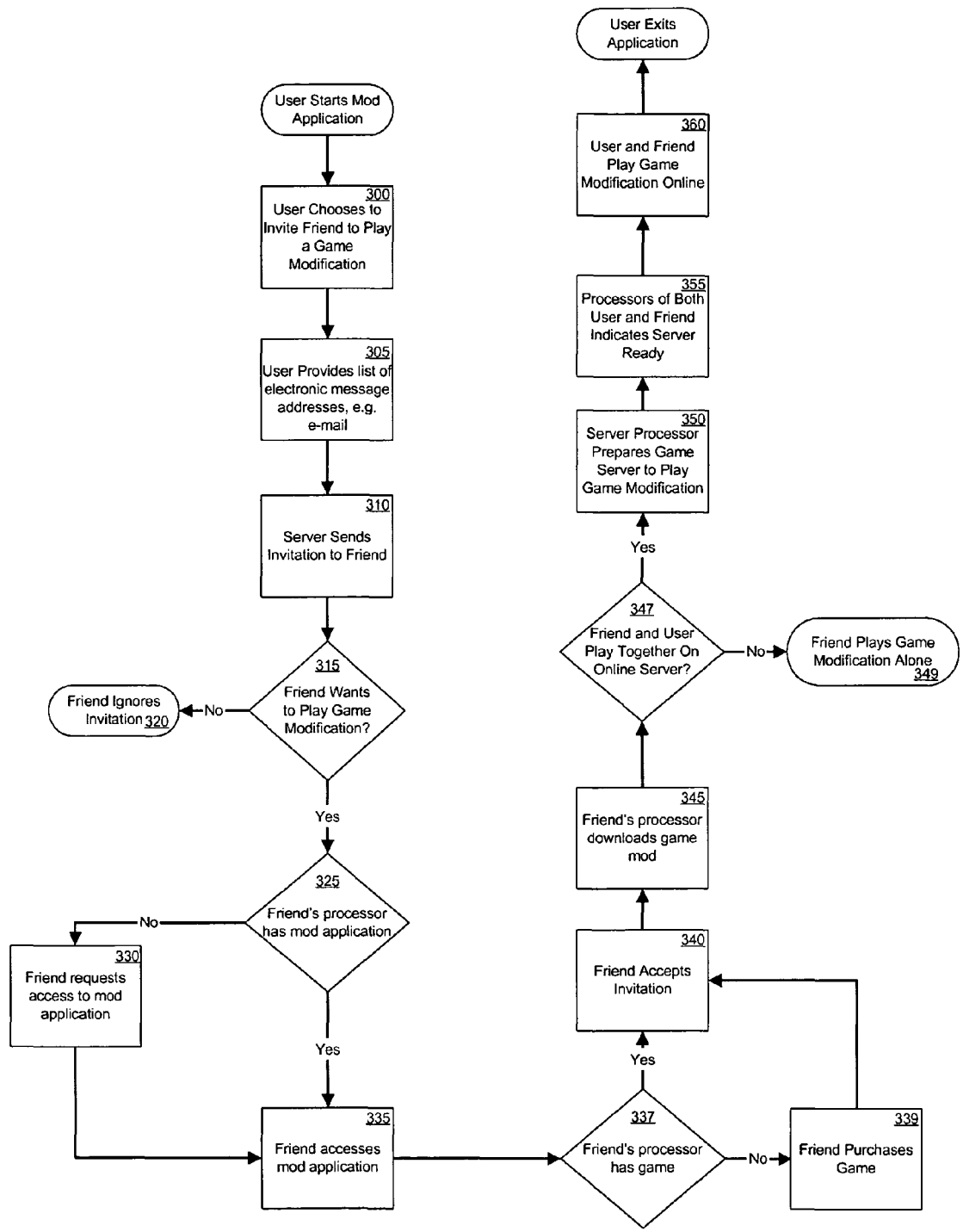
FIG. 3 is a flowchart of the process of sharing game modifications with other users.

FIG. 3 is a flowchart of the process of sharing game modifications with other users. At some time after starting the MA, the user may invite another user 300, typically a friend, to play any game modification that the user has created or played himself/herself. The user provides the MA with one or more email addresses 305 and a written note to the intended invitees. The written note could be a standard note supplied by the MA, including proposed date and time for playing modification.

The MA conveys this list to the host server, and the host server sends 310 an invitation to each of the friends. This invitation can be sent to the friend's processor, mobile phone, personal digital assistant ("PDA"), console or other device. The message to play the game modification selected by the user 300 is sent via email, sms, or other electronic messaging protocol. When the friend receives the invitation 315, the friend can either ignore the invitation 320, or can begin the process of setting up his or her processor 325 to play the game modification. If the friend already has the MA 325, the friend can immediately access the MA 335. However, if not, the friend can purchase or sign-up to use the MA 330 so that he/she may continue the process to use the game modification 300.

When the friend starts the MA 335, it will perform a check 337 to verify that the user has the appropriate underlying computer game required to play the game modification 300. If the friend does not have the appropriate computer game, then he/she will have to purchase/access 339 the required game. The friend could purchase the game in any of a variety of ways, including purchasing off-line from a brick and mortar vendor which would delay the game play or, the MA could provide an on-line vendor cite where the friend could purchase and download in real-time. Alternatively still, the MA could act as a real-time vendor of the underlying game.

At this point, the friend will have both the required access to the MA and the required computer game. The friend can then accept the invitation 340 to play the game modification. The friend's MA will download 345 the game modification from the invitation. If the user and the friend do not intend to play the game modification together on an online platform, e.g., server 347, then the friend finishes this process and plays the game modification alone 349. However, if they do intend to play the game modification together, the server will prepare a game server 350 to play the game modification online automatically in real-time or near real-time. The processors of both the user and the friend will indicate 355 that the server is ready to play. Both the user and friend will execute whatever commands are appropriate to play the game modification online 360 for that particular game. This will complete the process of inviting a friend to play a game modification.

Figure 4:
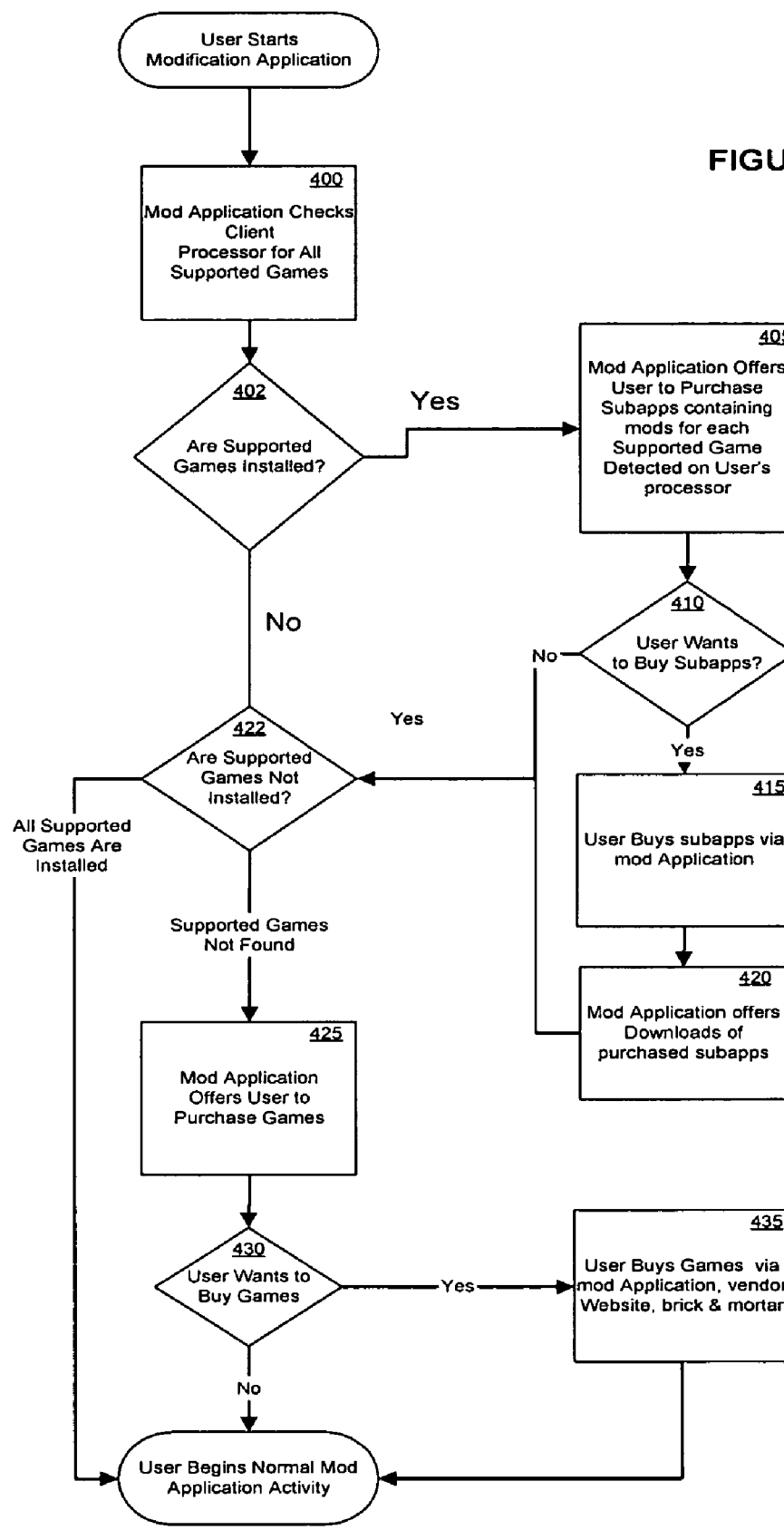
FIG. 4 is a flowchart of the process of auto-detecting installed games on the client processor and using this for marketing purposes.

FIG. 4 is a flowchart of the process of auto-detecting installed games on the user processor and using this information for marketing purposes, i.e., in order to offer game modifications or the ability to modify games via the MA. This embodiment assumes that the user has access rights to the MA. When the user launches the MA, the MA automatically checks 400 for all supported games to see if they are installed on the client processor. If the MA detects that supported games are installed 402, the MA offers 405 the user to purchase and/or access and download the appropriate subapplication of the MA for each installed game that is supported but that is not already installed. The subapplication contains the library of modified content for that particular game.

For example, if there is a subapplication of the MA that supports a hypothetical game called "Bungee Jump", then the MA will check 400 to see if the user has the Bungee Jump game installed on his/her processor. If the user does, in fact, have that game installed, then the client will offer the user 405 to purchase access to the subapplication of the MA that supports the game Bungee Jump. In the case where the user does want to buy access to the subapplication of the MA 410 (like for Bungee Jump), the MA (or a website) will process the transaction 415 and the MA will download and install 420 the newly purchased subapplication.

If there are any games that are supported by the MA 422, but not installed on the client's processor, the client will offer the user to purchase each of those games 425. So for example, say the user does not have the game Bungee Jump installed but the MA does support that game. In this case the user will be offered to purchase 425 Bungee Jump. Once Bungee Jump is installed, the client will detect it 402 and offer to the user to purchase the subapplication containing modifications to Bungee Jump 405 as detailed in the beginning of this process. If there are no such games that are supported by the invention but are not installed, then the user will exit this process and continue with normal client activity. However, if the user does want to purchase the game 430, the user will be able to purchase the game 435 within either the MA or through a website provided by the MA. Alternatively, the user may purchase the game from a brick and mortar vendor. After this step, the user will exit this process and continue with normal client activity.

Figure 5:
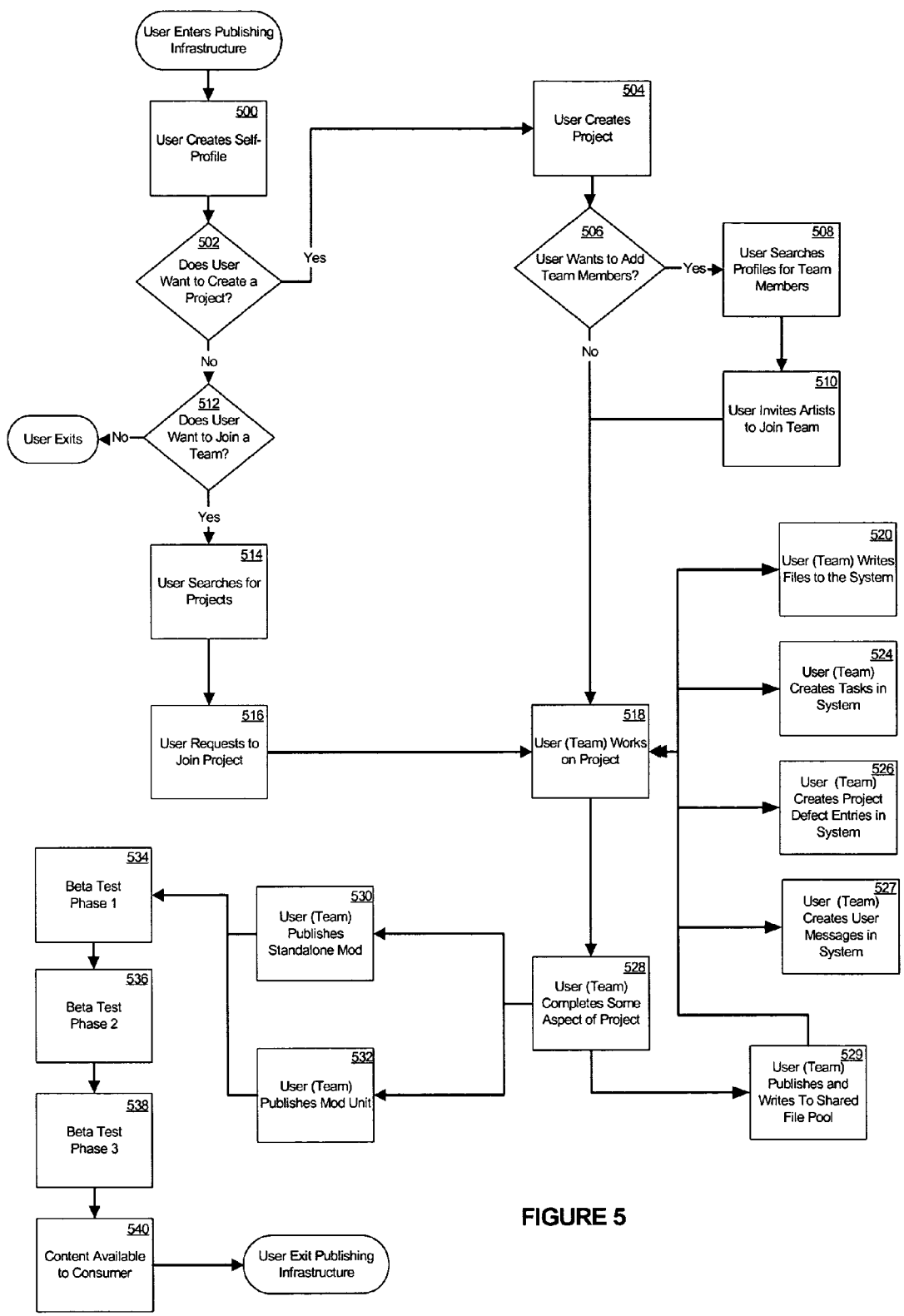
FIG. 5 is a flowchart of the process used by the publishing infrastructure.

FIG. 5 details a process according to an embodiment of the invention for utilizing a publishing infrastructure (hereafter "infrastructure") in order to create, test and market game modifications. The publishing infrastructure is intended to facilitate and simplify the process of producing game modifications for the game modification developer. The preferred embodiment of the method surrounding the publishing infrastructure is to allow free usage of the publishing infrastructure in return for exclusive distribution rights of the products created therein. For example, if a person is a developer and needs the use of a collaboration and publishing infrastructure for his or her team to create a game modification with 5 Army tanks, the person can use the publishing infrastructure with no hard cost associated with it. Once the game modification with the army tanks is created, however, it may only be distributed through the MA described herein with respect to FIGS. 1-4. Alternate embodiments are to charge a flat or monthly fee for the use of the publishing infrastructure.

The infrastructure is comprised of applications for facilitating the creation, testing and distribution of game modifications. One skilled in the art recognizes that such an infrastructure may be implemented through any number of client/server and networking configurations and architectures. In a preferred embodiment, the developer accesses the infrastructure from a web browser or client application. Typically, at the point of starting use of the system the developer will create an online profile 500 of him/herself that details contact information, skills, known software applications, and any other required personal information. This can be viewed online by other developers, particularly when the developer is requesting to join a project team 516, or when a developer has created his or her own project 504 and is searching 508 for other developers to join the team.

Once the developer profile is created 500, if the developer desires 502 the developer can create a project 504 on the system. Such a project contains a profile that describes the intended output of the project, a file storage system 520, task assignment system 524, bug tracking system 526, messaging system 527, and other functionality that can be used to aid in the production of the project.

In some cases, a developer who has created a project may want to add team members 506 to the project as additional labor. The developer will search 508 for team members based on the skill sets, experience levels, and other criteria contained within the developer profile. The developer will select appropriate candidates for joining his or her project and invite them 510 to join the team. The invitee may accept or decline this invitation.

To work on a project, a developer must either create his or her own project 502, or join a project created by another developer. The process of joining another developer's project is firstly to search 514 for desired projects based on the criteria in the project profile. For any projects that the developer deems worthy of joining, the developer will request to join the project 516. The creator or otherwise authorized team member of such projects will accept or decline this request. If the request is accepted, the developer will become a team member for that project and can work 518 on that project.

The process of working on a project 518 includes using many collaboration and work-saving features that operate over the Internet. The first such feature is a file system 520. This is a filesystem that can be accessed by team members through a web browser, ftp (file transfer protocol) client, or similar client application. Team members from a single location or widespread geographic areas are all able to write, read, move, delete, and otherwise manipulate files and folders in a shared environment. It also allows for file versioning, a process whereby the servers that host the publishing infrastructure maintain all past versions of a file in case the developer would like to view an older version of any given file.

Another feature supporting project work is a task assignment system 524. This allows developers to create tasks for themselves, or other team members working on projects that the user is a member of. The tasks are stored in the database, and can be linked to files within the system.

Another feature supporting project work is the defect tracking system 526. This system allows a developer to create database entries that detail any "bugs" or defects in the project. These defect entries may be assigned to the user, or to other team members within the system.

Another feature supporting project work is a messaging system 527. This is an interface that allows team members to communicate in writing by creating emails, instant messages, or notes that are given to other team members. These communications can be linked to other files within the system.

The collaboration system also features a shared file pool 529 for use with other teams. This system allows various teams to both use from and contribute to a central library of files for a project. For example, one team might create and complete 528 a 3d model of a tank that another team can use. Any team that uses a file contributed to the shared pool must compensate the team by paying a share of royalties from revenue generated by the project that uses the shared file. An alternate embodiment of the file sharing pool compensation is for teams that contribute to the shared pool to receive ownership shares (similar to stock shares) that receive a percentage of the total revenue generated by the invention. Another alternate embodiment is non-monetary system whereby a team that wishes to use a file must contribute a file of equal quality to the shared pool for others to use.

During the normal course of work 518, the user may complete one or more aspects of the project 528 that are worthy of being published 532 as part of a game modification. For example, the user may complete a single army tank and wish to publish it for use in the MA as a game modification. While the project might be to create 5 such tanks, this one tank is ready to publish 532.

Alternatively, the developer or team may complete an entire game modification 530 that does not use the MA for delivery to the end user. This is a standalone game modification and typically includes a software installer to make use easier for the game-playing user.

The process of publishing content 532, such that users of the MA can play it as a game modification, is facilitated by a special publishing interface. This publishing interface allows the developer to publish his or her content for use as a game modification without requiring underlying knowledge of the manipulation of game configuration files. For example, the developer would publish a tank by selecting the appropriate 3d model, texture, sound and other files that comprise the tank, and select any values such as cost by entering a number into a text input field. At the appropriate time, the system will generate the required game configuration files such that the published tank is included within the game.

Further to the processes of publishing content 530, 532, the infrastructure uses a compatibility layer which allows modified content created independently by numerous developers or development teams for a particular game or type of game to be interoperable and combined together to form new game elements. The compilation of modified content to form a game modification can occur at any point, all the way up to the point of playing the game, without any specification of what the content is or will be. For example, according to steps 500-528 of FIG. 5, a first developer might create a soldier character for an American Revolution war game, and second developer might create a musket-style gun with a bayonet, and a third developer creates a game "map" that is modeled on the Battle of Trenton which serves as the environment for the users to play within. Because this content is published according to the requirements of the compatibility layer, a user, i.e., the game player, using the MA, can add each item of content all together into one game that he/she can play. This is accomplished by using a neutral compatibility layer where the file references for the individual content items are not named according to the default scheme required by the game as per the prior art, and thus can later be changed so that the file references for the content items point at the appropriate reference locations for the new items of content.

For example, in an implementation of the compatibility layer, modified game maps may contain references to game content that is specified only to the extent that they could be used to represent content during game play, but unless selected, do not appear during game play. These references are "null" references or arbitrary strings such as "ReplaceMe" that can be located later by the MA. For instance, the Battle of Trenton game map mentioned above could contain ten (10) "null" rifle references, and ten (10) "null" sword references which are placeholders within the map. The infrastructure allows the game playing user, as desired, to place from zero (0) to ten (10) of the various rifles and from zero (0) to ten (10) of the various swords at the pre-specified locations to create the modified game. The unused references do not show up in the game. This allows the user to dynamically add varying amounts of game content.

In another example of the implementation of the compatibility layer, in a game map which includes weapon spawn s, i.e., places within the map where weapons appear during game play, the developer places "null" weapon spawns as placeholders in the map that can be edited later by the MA to contain actual weapon spawns for in-game play. The actual weapon spawn to be created is specified outside of the map in, e.g., a script file, that the "null" weapon spawn is directed to during the creation of the map. With the script file outside of the map it can be changed without affecting the map itself. Additionally, with "null" weapon spawn scripts, the game map is open to a wide variety of weapon play types that can be created at will by the game player using the MA, for example, a battle of many types of modern rocket propelled grenades but set at the Battle of Trenton during the American Revolutionary war.

Similarly, "null" weapons are placeholders for weapons in a proposed game modification. The "null" weapons allow additional weapons to be added to the game with out the need for the game to be recompiled. The "null" weapons are multiple copies of certain classes of weapons, and they can be made to be completely unique weapons by changing a few parameters, and giving them a new model. With the "null"

weapons it is possible to create a wide range of game play, by being able to provide a large selection of many different kinds of weapons.

While the preferred embodiment of the infrastructure system and method requires users to format developed content according to the specifications of the compatibility layer, the infrastructure may include the ability to auto-detect content references that can be retro-fitted to use the compatibility layer, i.e., where content has been specified, the infrastructure is able to detect those content references and retro-fit to include a "null" reference in order to allow for configuration and inclusion within modification games in the MA.

The process of providing quality control for the published content is a three-phase beta testing process. In phase one 534, the developer or team is required to test the published file within the MA as if it were generally available to all users. However; only the project team has access to this published content in phase. In the example of publishing an army tank, once the tank has been published, the developer (or another team member) would direct the MA to include the tank in a game modification. The developer would download and play the game modification to verify that there were no defects in the tank. If there are any defects, then the developer will fix the files and re-publish them. If there are no defects, the developer will certify that the tank has passed phase one.

Once the developer or other team member has tested the content he or she may certify that it functioned successfully with no defects by clicking a button within the interface. This will complete phase one 534.

Phase two 536 of the beta testing process is when the content is made available in the MA for only a select group of developers outside of the project team that test new content. The developers will test the content through the MA as if it were generally available to all users, even though only they and the project team are allowed to see the content. Once a certain number of phase two testers certify that the content is defect free and of high artistic quality, the content will move on to phase three 538. If a tester says that the content has a defect, the developer will have to correct the defect and resubmit to stage two before it can be published. Additionally, if a preponderance of stage two testers say that the content is of low artistic quality, the developer will have to improve the artistic quality and resubmit to stage two testing before becoming eligible for stage three testing.

In the example of the tank in phase two 536, once phase one 534 is completed the tank will become available to a larger group of testers that are not part of the project team. Each person that tests the tank will record the results of their testing. Say that the tank has a flaw in the turret. The tester will report the flaw. If the defect is both serious and verified by authorized users of the publishing system, this will cause the developer to get a notification that the content has failed stage two testing. The developer must repair the defect and begin the process again at phase one 534.

Phase three 538 of the beta testing process is when the owners of the publishing infrastructure system itself approve the content. There are two approvals required here. The first is a test for defects by employees of the owners of the infrastructure in much the same way of testing as phase one 534 and phase two 536. Any substantial defects found must be repaired by the developer and the process begun again 534. The second approval is for whether the quality and type of content is appropriate for the system itself. Take the example of a tank. It may successfully make it to phase three and pass the testing for defects. However, there may already be a similar tank published. In this case, the tank would be refused publishing into the modification application.

If the content is approved, it is added to the MA library, described above with reference to the processes shown in FIGS. 1-4, and made available for use by subscribers to the MA 540. The processes described herein facilitate mixing and matching of game modifications across content types, game levels (environments within an individual game), game titles (individual games such as Half Life or Madden 2006), and processors (such as a personal computer, Xbox, Playstation). A further feature of an exemplary embodiment of the present invention is the availability and display of the history of where each available game modification has been used. For example, a user may like a particular weapon modification. This user can view the history of which games and where this weapon modification has been used and play or modify those games further. The ability to view history of modification use may inspire new and different modifications across different games.

Figure 6:
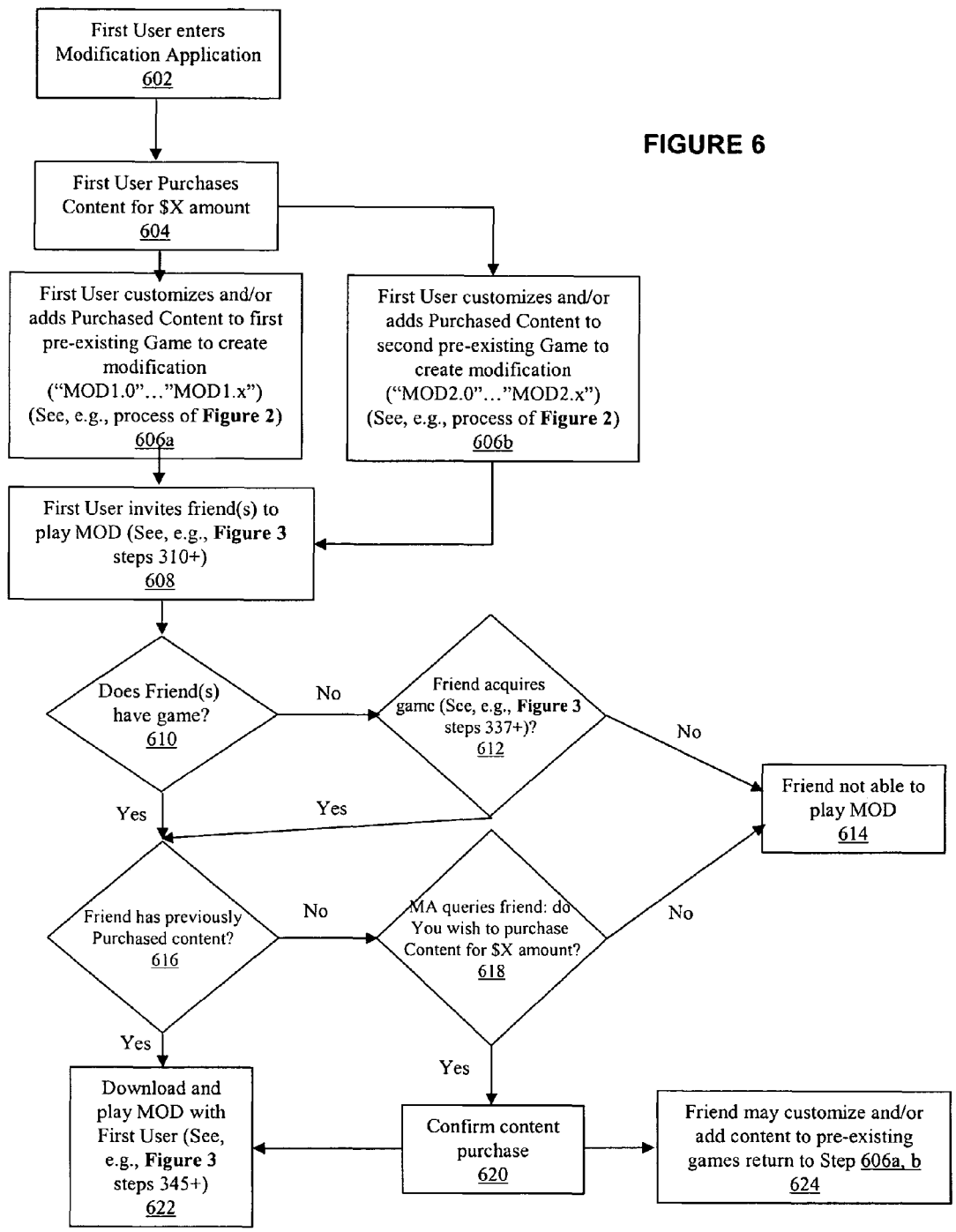
FIG. 6 is a flowchart of a first exemplary content sharing process.

Referring to FIG. 6, a first content sharing process is described for facilitating the generation of revenue to the MA host and the efficient sharing of modifications among multiple users. The process is most easily described with reference to the following example: the first user enters the MA 602 purchases content from the MA 604, e.g., squirt gun that shoots acid at characters for $4.00, for addition to an underlying game 606(*a*), 606(*b*), . . . 606(*z*). The first user would like to make this content available to, e.g., 10 other users as a modification(s) (MOD1.0, . . . MOD1.x) to the first underlying game when they play on-line and invites the other users or "friends" to do so 608. Friends as described herein are pre-designated to the MA by each user, e.g., like a buddy list. For each embodiment, the first user may be limited to inviting just those on the predefined friends list to play MODs or even further limited to a specific number of users on the predefined friends list. The MA may allow for additions to the friends list over time and/or once a user has purchased a predetermined amount of content. In a this first content sharing process, each of the 10 friends are required to have the underlying game 610-612 and to pay the $4.00 content fee 616-620 prior to being able to access the content and play the MOD 622. If the friends do not purchase or pay for the content, they are unable to play the MOD 614. Once the friends have paid the content fee 620, friends may individually modify the content as well 624. Acquisition of the underlying game may be free in the case where the MA offers the underlying game for free, or the friends may need to purchase the underlying game, e.g., in the case where the game is a third-party or off-the-shelf game.

Figure 7:
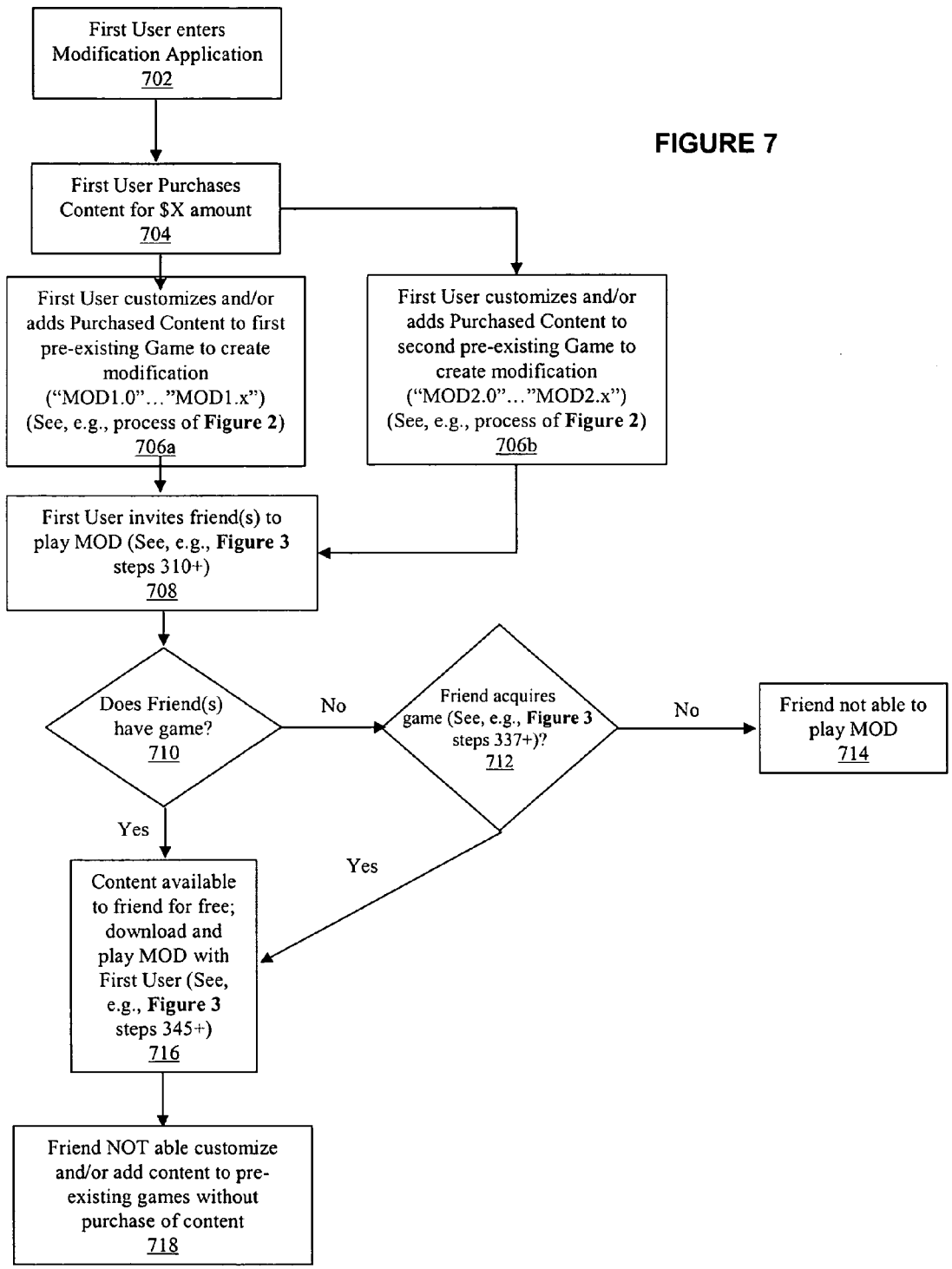
FIG. 7 is a flowchart of a second exemplary content sharing process.

Alternatively, in a preferred second content sharing process exemplified in FIG. 7, the present invention allows the first user to enter the MA 702; purchase content for a pre-determine amount as set by the MA 704; develop MODS using the content and underlying games (either off-the-shelf games or MA developed games discussed further below) 706(*a*), 706(*b*), . . . 706(*z*); and share the modified game through the invitation process 708, including the revised content, free of charge to the 10 other users 716. As with the first content sharing process, the friends must acquire the underlying game in order to play the MOD 710-712; but the content is free 716. Acquisition of the game may be free in the case where the MA offers the underlying game for free, or the friends may need to purchase the underlying game, e.g., in the case where the game is a third-party or off-the-shelf game. Friends are not able to use or modify the content itself in this content sharing process because they did not purchase the content 718.

Referring to the example above, in this preferred second content sharing process, the first user has purchased a graveyard map (or level) for $10.00, the $4.00 squirt gun that shoots acid and a $4.00 grim reaper weapon. This content has been added to an underlying game to create a modified game that allows users to use all of the content originally with the underlying game, e.g., characters, weapons, etc. in the graveyard map, and additionally to use the squirt gun and/or grim reaper weapon with the maps that are original to the underlying game and the graveyard map. In the first content sharing process, each user would have to spend $18.00 to get the additional content and play the modified game. In the preferred second content sharing process, only the first user pays the $18.00 for the additional content. The first user bundles the additional content to be used with the underlying game. The MA then allows the first user to share the bundled content with any other user free of charge to the additional users for use with the underlying game.

Further to the second content sharing process, a specific implementation of this process includes allowing the first user as part of the subscription to the content, to host a server and share the MOD containing the content with other users. The use of the MOD on the server would be free of charge to the additional users.

Applicable to all users who purchase content in the first and second content sharing processes, is the ability for the users to continue to change the purchased content free of additional charge and, in the second content sharing process, to then share these changes with other users free of charge. For example, for each piece of purchased content, there might be customizable aspects to the content. Referring to our previous examples, the $4.00 squirt gun may be customizable in that it can shoot acid, fire or water. Once the user purchases the $4.00 squirt gun, the user can continually customize between each of the choices and then share this customization with other users. Similarly, in the example where the first user purchases the graveyard map, this purchase allows the first user to continually customize content within the map without additional charge. Customizable content within the map could include weapon types (e.g., squirt gun or scythe or rocket-propelled grenades), weapon effectiveness (e.g., how many shots does it take to kill or which weapon kills which character or which weapon kills versus injuring), weapon locations (e.g., in certain crypts or behind certain tombstones), the availably of re-newed lives, the types of characters (e.g., living people, ghosts, vampires, aliens) etc. The first user may continually customize this content and share the changes with other users. Further to this customizable aspect of the content sharing process, the users who purchase content may also use and customize that content with other underlying games and in any map or level within the underlying games without additional payment. As in previous content sharing processes, friends who are invited to play modified games containing customized content are not themselves able to customize content unless they make the requisite purchase.

In a third content sharing process, all users who have subscribed to the MA have access to all content available through the MA as long as their subscriptions are valid. Accordingly, there are no additional fees for any users for individual content, only the subscription fee which could be, e.g., monthly. This subscription fee would include the ability to customize and add the content while the subscription was up to date.

Figure 8:
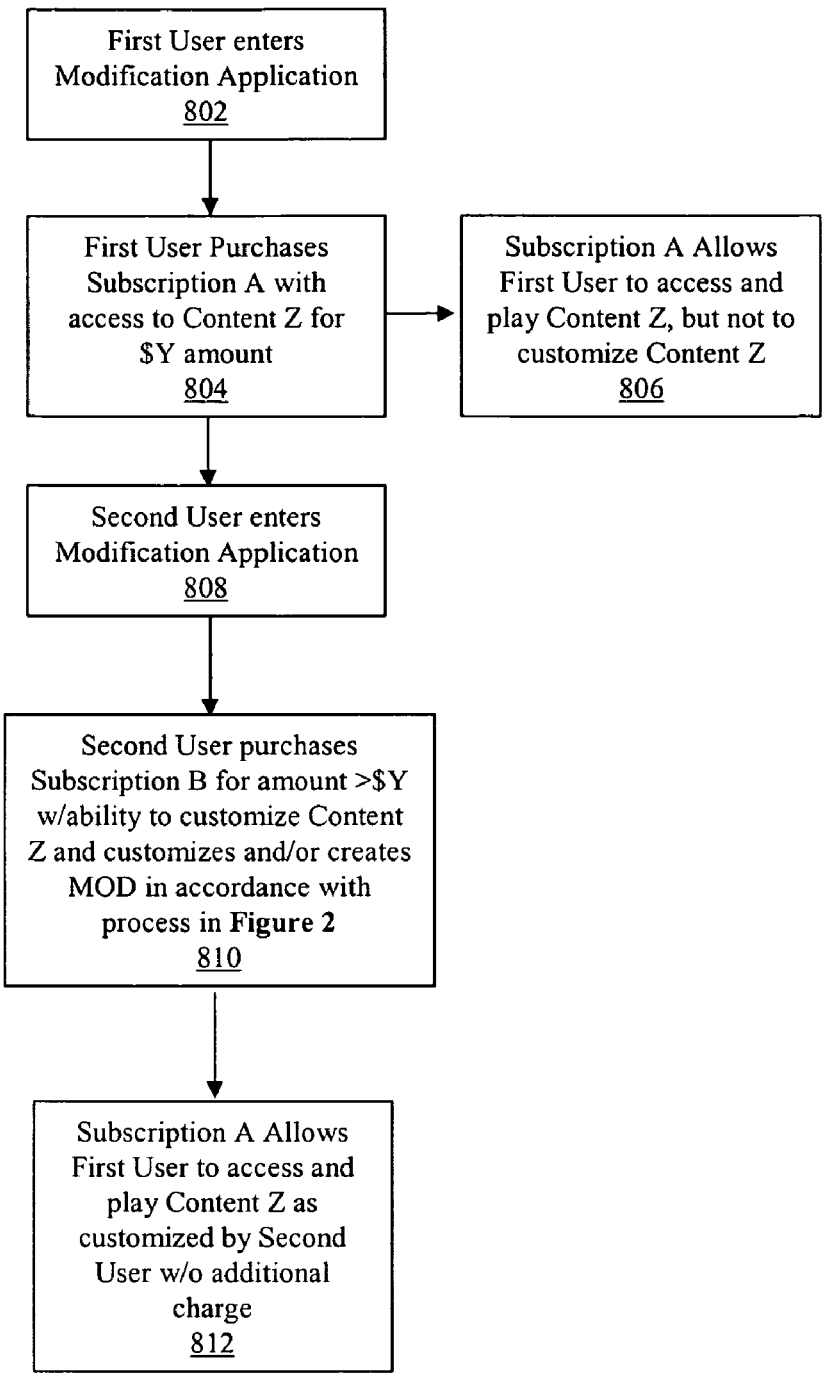
FIG. 8 is a flowchart of a third exemplary content sharing process.

Additionally, the third content sharing process can be more restrictive. In this more restrictive process exemplified through FIG. 8, the subscription does not buy unlimited access to content available through the MA. Instead, the subscription buys access to a subset or subsets of content and different levels of content availability and customization. A user could purchase multiple subscriptions and thus have access to multiple subsets of content. As shown in FIG. 8, a first user enters the MA 802 and purchases Subscription A which allows the first user to access Content Z 804. Subscription A allows the first user to access and play Content Z, but not to customize content Z 806. A second user enters the MA 808 and purchases Subscription B which gives the second user not only the ability to access and play Content Z, but also the ability to customize Content Z and create MODS with underlying games 810. The first user may access and play customized content Z and MODs including content Z developed by the second user with no additional charge 812. Subscription B could either be a flat fee or an add on fee if the user already has subscription A.

An example of a subset of content could be a map, level, groups of maps or levels, characters, weapons or any other content or group of content. For example, the graveyard map referenced in the example above could represent a subset of content to which a user could subscribe. The user would pay to play this map, e.g., for $1.00. This would be Subscription A in FIG. 8. This $1.00 would not allow the user to customize the content on the graveyard map, but if others, i.e., a second user, paid to customize, e.g., under subscription B, the $1.00 allows the user to access and play the map as customized by others. And if a user wishes to actually customize the graveyard map, the user would be required to pay for the additional content necessary for the customization, this would be Subscription B in FIG. 8. In a first specific embodiment the first user would only be able to play with the customized content upon invitation. Alternatively, the users with subscriptions A or B would have access to and be able to play all modifications which include the customized content as a part of their subscriptions. The MA would, for example, post on a bulletin board all modifications using the content and those with subscriptions A and B to that content could access and play. But only those with subscription B would be able to further customize.

In a fourth content sharing process, the MA offers users access to a game engine, i.e., software, which provides the underlying technologies and development simplification tools to allow users to develop new content. Development of underlying content is different from customization of pre-exisitng content as discussed above. The game engine would have core functionality such as a rendering engine ("renderer") for 2D or 3D graphics, a physics engine or collision detection, sound, scripting, animation, artificial intelligence, networking, and a scene graph. Accordingly, instead of purchasing pre-developed content, e.g., a squirt gun that shoots acid, users are able to actually bring an idea for content to the game engine and have the game engine render the content.

Figure 9:
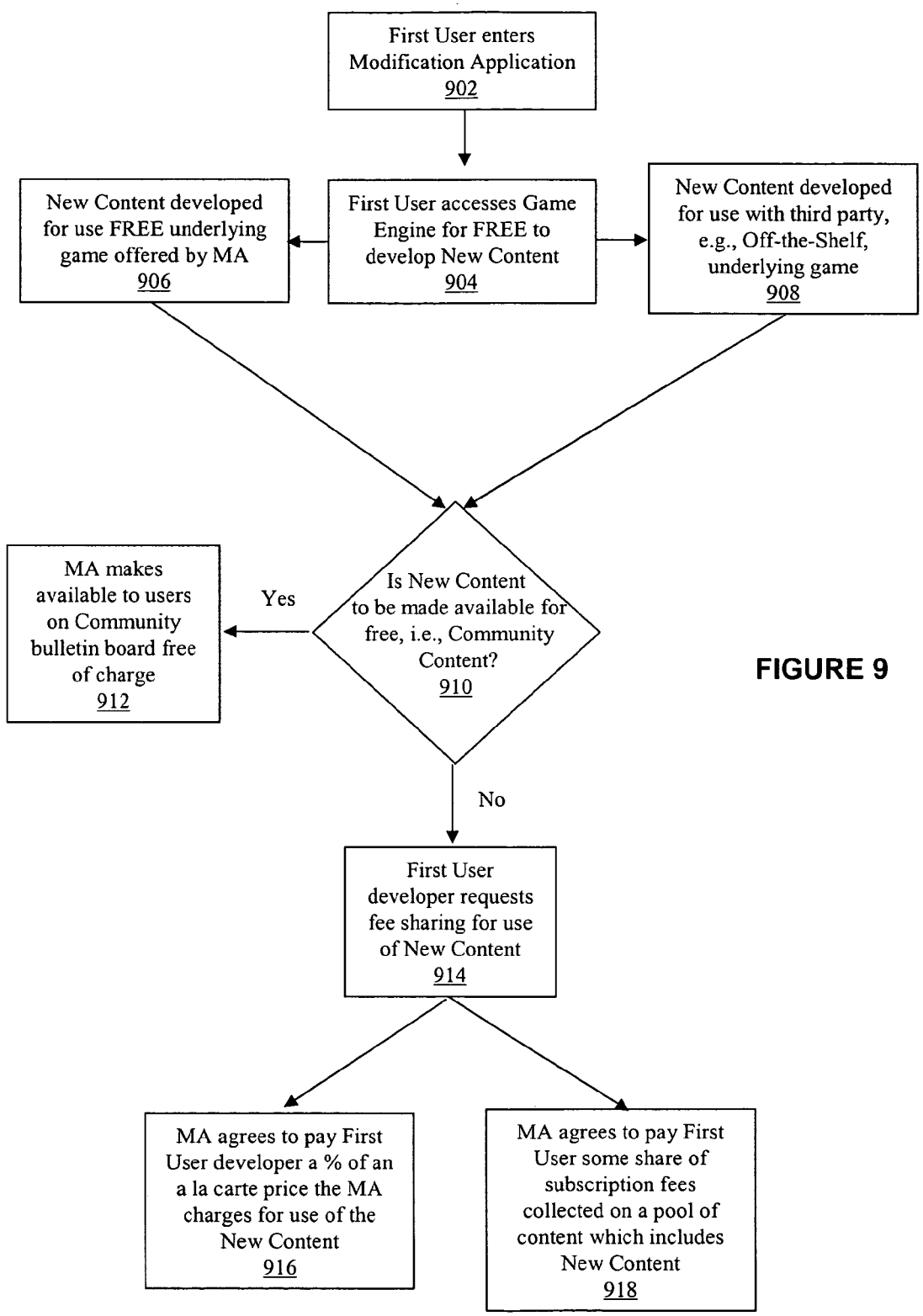
FIG. 9 is a flowchart of a first specific implementation of a fourth exemplary content sharing process.

Referring to FIG. 9, the first user, i.e., developer, enters the MA application 902 and accesses the game engine free of charge 904. With this access to the game engine, the first user may develop New Content (NC). This NC may be developed for use with a free game developed by the MA 906 or with a third-party, e.g., an off-the-shelf (OTS), game 908.

Once created, the first user developer has various options regarding making the NC available to other users. The first user developer can consider whether they wish to make the NC available to all users for free, i.e., should the NC be community content? 910. If yes, then the MA facilitates the open availability of the NC by, for example, posting the NC on a community bulletin board 912. If, alternatively, the first user developer would like the MA to consider sharing revenue generated from subscriptions to use the NC, the first user developer makes such a request of the MA 914. If the MA chooses to share revenue, a first scheme would include offering the NC as an a la carte item off of a content menu and giving the first user developer a percentage of each "sale" of the content off of the menu 916. A second scheme would involve ratable or weighted payments to the first user developer resulting from subscriptions to a pool of content which includes the NC among other content 918.

In a fifth content sharing process, the underlying game is developed by the MA and offered for free from the MA. For example, the MA develops the first level to a game, as a creative starting point for users. Users would then be able to develop content, e.g., additional levels, characters, weapons, etc. and add to the first level underlying game built by the MA using the game engine as described with respect to the fourth content sharing process. This variation to the fifth content sharing process would eliminate the requirement to purchase an off-the-shelf game. For users who actually develop new content for the underlying game using the game engine, this use of the game engine is free. For all users, access to the MA developed portion of the underlying game is free, e.g., the first level and any content originally included in the first level. Users can play this first level for free. If users wish to play the underlying game with additional content, either pre-existing content already available through the MA or community content developed by other users using the game engine, there would be fees associated with purchasing and using this content with the underlying game. Other variations of content sharing processes described herein, e.g., offering content for free or for a fee, may be used with the feature of the free underlying game.

For each of the content sharing processes described above, the sharing of content, e.g., MODs, by the first user with other users for free could further be limited. For example, the MA could limit the number of users with whom it could be shared for free to a specific number. Alternatively, MA could limit the number of users to those listed on a pre-existing friend, clan or buddy list ("Friend list"). The MA could require that this "Friend List" be pre-established with the MA.

In a sixth exemplary content sharing process, the MA offers all access to content to all users for free. Revenue is generated through advertising fees paid by advertisers wishing to place ads on the MA website. A portion of this revenue can be shared with first user developers who develop content using the MA game engine.

The embodiments set forth herein are intended to be exemplary and in no way limiting. One skilled in the art can appreciate the many variations to portions of these embodiments and the resulting alternative embodiments which fall within the scope of the invention as set forth herein. Further, one skilled in the art understands the many hardware and software configurations that may be used to implement the embodiments that are within the scope of this invention without undue experimentation.

The invention claimed is:

1. A method for sharing via a processing system modified content of a game capable of being played on a processor comprising:
   providing access via the processing system to a modification application including a list of pre-defined content embodied in content files to implement a modification to an underlying game;
   charging via the processing system a first fee to access each pre-defined content file;
   accepting via the processing system user selection of and payment of the first fee for at least one pre-defined content file for use in modifying the content of the underlying game;
   modifying via the processing system the underlying game using the at least one pre-defined content file to create a modified game;
   facilitating via the processing system the invitation of at least one additional user to play the modified game;
   charging via the processing system the at least one additional user a second fee for the use of the at least one pre-defined content file within the modified game wherein the first fee is greater than the second fee and payment of the first fee allows a user to access and customize the content within the at least pre-defined content file, whereas payment of the second fee allows only access to the content within the at least one pre-defined content file via the processing system.

2. The method according to claim 1, wherein the first fee and the second fee are the same.

3. The method according to claim 1, further comprising: confirming via the processing system that the at least one additional user has acquired the underlying game.

4. The method according to claim 3, wherein the at least one additional user acquires the underlying game free of charge from the modification application via the processing system.

5. The method according to claim 3, wherein the at least one additional user acquires the underlying game for a third fee from one of the modification application and a third-party via the processing system.

6. The method according to claim 1, wherein the first fee allows the first user to create multiple modifications to the underlying game using the at least one pre-defined content file via the processing system.

7. The method according to claim 1, wherein the at least one pre-defined content file contains at least one of the following types of content: a level, a map, a character, a weapon.

* * * * *